United States Patent [19]
Gardner

[11] 3,816,651
[45] June 11, 1974

[54] AUTOMATED IMAGE ANALYSIS EMPLOYING AUTOMATIC FOCUSSING

[75] Inventor: Gerald Marvin Gardner, Saffron Walden, England

[73] Assignee: Image Analysing Computers Limited, Hertfordshire, England

[22] Filed: Sept. 22, 1972

[21] Appl. No.: 291,179

[30] Foreign Application Priority Data

Sept. 22, 1971 Great Britain .................... 44132/71
June 28, 1972 Great Britain .................... 30278/72

[52] U.S. Cl. .......................... 178/7.2, 178/DIG. 29
[51] Int. Cl. ............................................ H04n 5/34
[58] Field of Search ......... 178/DIG. 29, 7.2, DIG. 1, 178/7.92; 350/46; 250/396–400, 310, 311; 315/23, 31

[56] References Cited

UNITED STATES PATENTS

| | | | |
|---|---|---|---|
| 3,356,792 | 12/1967 | Peters | 178/DIG. 29 |
| 3,450,833 | 6/1969 | Hobrough | 178/DIG. 29 |
| 3,621,136 | 11/1971 | Stanwood | 178/DIG. 29 |
| 3,699,248 | 10/1972 | McKechnie | 178/DIG. 29 |
| 3,721,759 | 3/1973 | Lang | 178/DIG. 29 |
| 3,721,827 | 3/1973 | Reinheimer | 350/46 |

*Primary Examiner*—Robert L. Richardson
*Attorney, Agent, or Firm*—Oblon, Fisher, Spivak, McClelland & Maier

[57] ABSTRACT

In a method of analysis which involves the formation of an image of each of a series of different areas of a specimen on the photocathode of a television camera tube for scanning in known manner by an electron beam to produce a video signal of each area for analysis, the image of each nth area is automatically focussed and the focus setting is maintained for the intervening areas. This reduces the total analysis time which if every imaged area is focussed separately is otherwise excessive.

Where the series of areas is obtained by stepping movement of the specimen to define a series of parallel lines, the image of the first area in each line is also focussed automatically to reduce the effect of specimen tilt. Electrical signals describing the position of the focus adjusting controls may be stored from the first area of one line to the first area of the next line and used to make a preliminary adjustment of the focussing controls before the first area of each line is focussed automatically.

A backlash eliminating process involves selecting a preferred direction of reaction of the focus adjusting drive motor and the automatic generation of two motor current pulses in succession when movement in the non-preferred direction is required, the first pulse producing an excess movement in the non-preferred direction and the second producing a smaller movement in the preferred direction so that the next displacement is in the non-preferred direction.

13 Claims, 15 Drawing Figures

AUTOMATED IMAGE ANALYSIS EMPLOYING AUTOMATIC FOCUSSING

This invention concerns automated image analysis systems employing automatic focussing systems which include means for adjusting the focus of an image, means for deriving an electrical signal indicating the focus of the image and a servo mechanism operating on the means for adjusting the focus of the image, an error signal for the servo mechanism being derived from the focus indicating electrical signal.

A typical automatic focussing system is shown in FIG. 10 of our U.S. Pat. No. 3,728,482. As will be appreciated, the resolution of the focussing system will be determined by the size of the incremental step made by the focus adjusting means in response to a perturbation signal. The smaller the step size, the better the resolution. However, the time required for the system to "find" the position of correct focus will be correspondingly increased.

Where it is only required to correctly focus a single image which is going to be required for, relatively speaking, a long period of time, this time loss during focussing is unimportant. However in the field of automated specimen analysis it is more usual that each image is only one of many, of example derived by locating different areas of a microscopic specimen in the field of view of the microscope, the final image of which is presented to a television camera from which the video signal on which the analysis is to be performed, is obtained.

Where high magnification is employed, a complete analysis of a specimen may involve analysing the video signal obtained from, say 500 different fields of view. It is usually possible to effect the total analysis of each field of view, during a single frame scan of the television camera. If the latter is operating at say ten frames per second, and the specimen is moved in synchronism with the frame scan repetition rate by appropriate movement of the microscope stage, the total analysis of 500 fields can in theory take 50 seconds. A microscope having a stage which can move a specimen carrying portion thereof in this type of way is described in our U.S. Pat. No. 3,652,146.

However if an average of 0.5 seconds are required for an automatic focussing system to correctly focus the image of each successive field, then the total analysis time will be increased by 250 seconds (i.e. it will take six times as long to perform total analysis).

It is an object of the present invention to reduce the total time for an analysis involving a sequence of areas from a microscope specimen, or similar, when automatic focussing is employed.

According to the present invention a method of analysing a specimen which involves the steps of forming an image of each of a plurality of small areas of the specimen, scanning each of a succession of images to produce a video signal the amplitude excursions of which are analysed to perform said analysis and deriving an electrical signal indicating the focus of the image for controlling the operation of an automatic focussing system for focussing the image, comprises the further steps of:

enabling the automatic focussing system only prior to the analysis of the first small area and each *n*th small area thereafter (*n* being greater than one) and maintaining the focus settings achieved for said first small area and for each *n*th small area while the intervening small areas are analysed.

The succession of small areas of the specimen may be obtained by moving the specimen relative to the optical system of the microscope in a series of steps along parallel lines, similar to a conventional television scanning raster, without interlace. Where this is the case the method of the invention preferably comprises the further step of enabling the automatic focussing system prior to the analysis of the first small at the beginning of each new line. This further step overrides the sequence of focussing on each *n*th small area so that in general a new sequence is started at the beginning of each new line. However in this way the image of the first small area of each line will always be correctly focussed thus reducing the possibility of incorrectly focussed images at the beginning of each line due to "tilt" of the specimen surface.

The time required for each focussing operation at the beginning of each line provided by the said further step, can be minimized by the additional steps of storing information relating to the focus setting for the first small area of each line, for the duration of the line and returning the focussing system to this setting before the automatic focussing system is enabled at the beginning of the next line. In general the difference in focus between adjoining small areas in adjacent lines will be very small whereas the difference in the focus setting between the beginning and the ending of a line of small areas may be quite considerable if the specimen is tilted so that the specimen surface is not truly perpendicular to the optical axis of the microscope. By storing the information relating to the focus setting for the first small area of each line and returning the focussing system to this setting at the beginning of the next line, it will be found in general that very little correction will be required by the automatic focussing system thus reducing the number of focussing steps which are required.

The invention will now be described by way of example with reference to the accompanying drawings, in which:

FIG. 1 is a perspective view of a microscope fitted with a movable stage and television camera and is based on FIG. 1 of U.S. Pat. No. 3,652,146, FIG. 2 is a plan view of the stage assembly of FIG. 1 and shows the coarse focus drive, FIG. 3 is a section through the stage viewed from the front and illustrates the fine focus drive operated on by the automatic focussing system of the invention, FIG. 4 is a block circuit diagram of part of an image analysis system employing an automatic focussing system which incorporates the basic principle of the present invention, FIGS. 5*a* and 5*b* are block circuit diagrams illustrating an overall image analysis system and alternative automatic focussing system also embodying the invention, and FIGS. 6 to 14 inclusive are detailed circuit diagrams of the control circuits shown in FIG. 5.

For a detailed description of the microscope stage and operation of the coarse and fine drive mechanisms, reference is made to U.S. Pat. No. 3,652,146. As described therein the fine focus control mechanism is manually adjustable by a knob 74. Where automatic focussing is provided the knob 74 is replaced by an electric motor which is conveniently a so-called stepping motor. To this end, FIGS. 1 to 3 of the drawings illustrate a typical stepping motor mounted in place of the knob 74 with the stationary outer housing 75 of the motor fixed to the side of the outer frame assembly 18. A rotor (not shown) is mounted on the shaft 76 in place of the knob 74 previously fitted thereon and the shaft conveniently extends beyond the end of the housing 75 to permit the mounting thereon of a knurled 74'. Indications can be provided on the knob 74' to indicate the movement of the shaft 76. Furthermore the knob provides the facility for overriding the motor and manually operating the fine focus control.

The invention is of particular application where the microscope stage is fully automated. To this end electric motor drive means 30' (see FIG. 3) is provided for moving the carriage 30 relative to the carriage mount 32. Second electric motor drive means 32' (see FIG. 3) is provided for moving carriage mount 32 relative to the inner frame 22. Conveniently flexible drive means (not shown) communicate between the motors and the carriage and carriage mount respectively. To this end the motors 30' and 32' can be mounted at any convenient point within the stage assembly and their provision on the underside of the frame is only indicated by way of example.

The motors 30' and 32' are also conveniently stepping motors by which the carriage 30 and carriage mount 32 can be incrementally advanced in their respective directions. For convenience, the direction of movement of carriage 30 will be considered to comprise the so-called X direction and that of carriage mount 32, the so-called Y direction.

Part of an automatic focussing system which derives a focus adjust signal from the high frequency content of a video signal obtained by scanning an image which is to be focussed, is shown in FIG. 4.

As required by the invention a focus adjust or correct focus indicating signal is generated at the end of every $n$th frame scan of the scanner (not shown) producing the video signal supplied to junction 76. The number $n$ is selected by adjustment of a selector 77 which includes a counter to which the frame synchronizing pulses are supplied (designated EOF — i.e. End of Frame). The selector only opens gate 78 during every $n$th frame scan. The circuit thus illustrates the basic concept of the invention but it is to be understood that the invention is not limited to the particular circuit for obtaining the automatic focussing signal, which is intended to be by way of example only.

The video signal is amplified by a phase splitting amplifier 79 and both output signals are differentiated with respect to time by a differentiator 80. In this way a differential signal pulse will be supplied for line scan intersections with both leading and trailing edges of features.

The amplitude of each differential pulse is compared with a threshold voltage in a comparator 81 and during each $n$th frame scan the pulses which exceed the threshold are accumulated in an accumulator 82. If the magnitude of the accumulated signal is less than a second threshold voltage set by potentiometer 83, a second comparator 84 produces a warning signal X indicating that the image appears to contain no features.

Analogue comparison for the purpose of generating signal X is shown — but digital comparison may of course be employed alternatively.

The accumulated value signal from 82 is amplified by a device 85 which generates a signal 'B' whose value is the logarithm of the value of the accumulated signal. Signal B is compared in a comparator 86 with a signal A from a store 87. Signal A is the last signal B to have been generated and to this end, signal B from device 85 is also supplied to the input of store 87. Signal B may be in digital or analogue form, comparator 86 and store 87 being accordingly digital or analogue devices.

The output from comparator 86 is fed to a control signal generator 88 which produces three different control signals corresponding to $A>B$, $A<B$ or $A=B$. It is to be understood that the equality is only approximate and in practice the last of these three signals is generated if the difference between A and B is less than a predetermined value. The three control signals are supplied to a focus control device (shown diagrammatically at 89) by which the focus adjust motor 75 for example in FIGS. 1 – 3 is adjustable in equal incremental steps to alter the focus of the image. An ($A>B$) signal produces opposite-direction increments to those from an ($A<B$) signal and the ($A=B$) signal produces no further incremental movements.

The threshold voltage for comparator 81 is generated in the following manner. During the first frame scan of each sequence of $n$ scans, the gate 90 is opened and gates 91 and 92 are closed. A count pulse is generated by a monostable device 93 for each differentiated pulse which exceeds the threshold voltage in comparator 81. The count pulses are accumulated by accumulator 94 and a voltage is generated during the frame scan, which is fed back as the threshold voltage to comparator 81. At the end of the frame the voltage at junction 95 is a measure of the largest amplitude differentiated pulse and at the end of the frame, this voltage is transferred via gate 92 into a hold device 96. At the same time gate 90 is closed and gate 91 is opened and the voltage stored in hold device 96 serves as the source of voltage for the threshold voltage for the next ($n$−1) scans. As shown a proportion of the total voltage only is employed as the threshold and the proportion is selected by adjustment of potentiometer 97.

It is to be noted that the value of the accumulated voltage at junction 95 will increase slightly with improving focus, since the amplitude of the differentiated signals will increase with more sharply defined feature boundaries since these produce steeper leading and trailing edges to the video signal amplitude excursions at feature boundaries. This fact can be employed as a secondary indication as to whether a given focus correction has been made in the right direction.

An alternative circuit for obtaining the automatic focussing signal is shown in FIG. 5 (again by way of example only) in combination with associated parts of an image analysis system which operates automatically to present each of a succession of small areas for analysis. It will be noted that part of this circuit is based on the circuit for producing an automatic focussing signal illustrated in FIG. 10 of our co-pending U.S. Pat. No. 3,728,482. Reference is made thereto for a more complete description of the circuit blocks 132, 138, 140, 142, 144 and 136. It is to be noted however that the particular circuits for circuit block 132 are intended only to be exemplary and it will be appreciated that the invention is not limited to this or any other method of deriving an electrical signal indicative of the focus of the image in the video signal source.

For simplicity only the T.V. camera 100 is shown in FIG. 5. As shown in FIG. 1 this is mounted on the upper end of the microscope shown in FIG. 1 of the drawings. The camera 100 is arranged so that a final image of the microscope is formed on the camera target and appropriate illumination is provided (not shown) for illuminating the specimen either from below or above depending on whether the specimen mounted on the carriage 30 is a so-called reflecting specimen or a transmission specimen.

Circuits for providing the power supplies and scanning voltages for the camera 100 are not shown since it is believed that the provision and form of these are well known and would be obvious to one skilled in the art.

Likewise a conventional matching pre-amplifier etc. for the video signal from the T.V. camera 100 is not shown.

In order to indicate those elements in FIGS. 1 to 3 inclusive common to U.S. Pat. No. 3,652,146 and likewise those circuit blocks in FIG. 5 which are common to FIG. 10 of U.S. Pat. No. 3,728,482, the same reference numerals have been used as were employed in the drawings of the Paent and Patent Application respectively. To this end circuit blocks and items added to the Figures and in particular to FIG. 5 which constitute the embodiment of the present invention have been numbered from 150 onwards.

The video signal from camera 100 is divided at junction 150 and is gated via gate 152 to the focus signal deriving system 132 and via gates 154 and 156 to one input of a comparator 158 serving as a threshold detector. Selective operation of gate 152 in the manner described with reference to gate 78 of FIG. 4 enables the automatic focussing system only at selected intervals during a sequence of frame scans. To this end the other input to the comparator is supplied with a reference voltage typically from a potentiometer 160. The output from the comparator comprises constant amplitude pulses of duration equal to the detected amplitude excursions of the video signal. By detection is meant selecting those amplitude excursions which exceed the reference voltage. Alternatively of course the comparator can be inverted so as to provide detection when the amplitude of the video signal goes below the reference voltage as is well known to those skilled in the art.

The detected video signal pulses appearing at junction 162 can be analysed in any known manner and to this end no detail is given of the precise form of the analysing computer which may be employed. By way of example reference is made to our U.S. Pat. No. 3,619,494 which illustrates one form of image analysing computer whereby detected features in a field of view can be counted and sized inter alia on an area basis.

It is to be understood that the information for the computer can usually be derived from a single frame scan of the in-focus image in the T.V. camera 100. The sequence of operation (to be described) of the overall system shown in FIG. 5 assumes this to be the case. It is believed that it will be obvious to those skilled in the art that only minor modifications are required to enable the system shown in FIG. 5 to be adapted to provide for any number of frame scans to be gated via gates 154 and 156 to comparator 158.

GENERAL DESCRIPTION OF OPERATION

A specimen is mounted on carriage 30 and the carriage 30 and carriage mount 32 positioned manually or automatically so as to present a small area of the specimen in the field of view of the microscope and therefore on the television camera target. By providing appropriate electrical pulses to the stepping motors 30′ and 32′ the specimen can be incrementally moved relative to the optical axis of the microscope so as to present successively different areas of the specimen in the field of view and in this way either the whole or a defined area of the specimen can be presented over a period of time to the camera.

Approximate focus can be obtained by adjustment of coarse focus control 28 or 28′ and final adjustment made manually or automatically by turning knob 74′. This final movement is of course usually effected by the automatic focussing system as will hereinafter be described.

As provided by the invention, after the image has been fully focussed, an appropriate electrical signal is generated (signal INF from control circuit 142) and the video signal from camera 100 is supplied to the detector 158 and computer (not shown) during the next complete frame scan. At the end of that scan, the stage carriage and/or carriage mount 30 and 32 respectively are adjusted by the stepping motors 30′ and 32′ respectively to relocate the specimen and during the next frame scan the information from the new area presented to the microscope optics will be scanned and the video signal supplied via the detector 158 to the computer (not shown).

This is repeated until *n* steps in the X direction have been taken by carriage 30 when an end of *n* signal (EON) is generated. Signal EON inhibits further movement of carriage 30 and enables the automatic focussing system to re-adjust the focus of the image.

As soon as the in focus signal INF is available again, the automatic focussing system is inhibited and the analysis proceeds as before described unit *n* steps have been completed again in the X direction whereupon focussing is once again initiated.

The movement of the specimen on carriage 30 is typically in the form of a scan raster similar to that of a television camera and a further electrical signal is generated whenever the carriage 30 reaches the point in its movement at which it is about to "flyback" to the opposite end of carriage mount 32 at which time carriage mount 32 is stepped by one increment in the Y direction. This signal is labelled EOL and indicates end of line. The same action is arranged to take place whenever an EOL signal is generated as happens when an EON signal is generated.

A further refinement is provided in the form of a store and associated addressing circuits whereby the focus position obtained for the first area on each line of movement of carriage mount 32 is stored and the information stored is utilized to return the focussing controls to that same position for the first area on the next line of movement of carriage mount 32. In this way it is found that the refocussing delay at the beginning of each line of movement of carriage mount 32 is reduced to the minimum.

DETAILED DESCRIPTION OF COMPLETE SYSTEM

Figure 1:
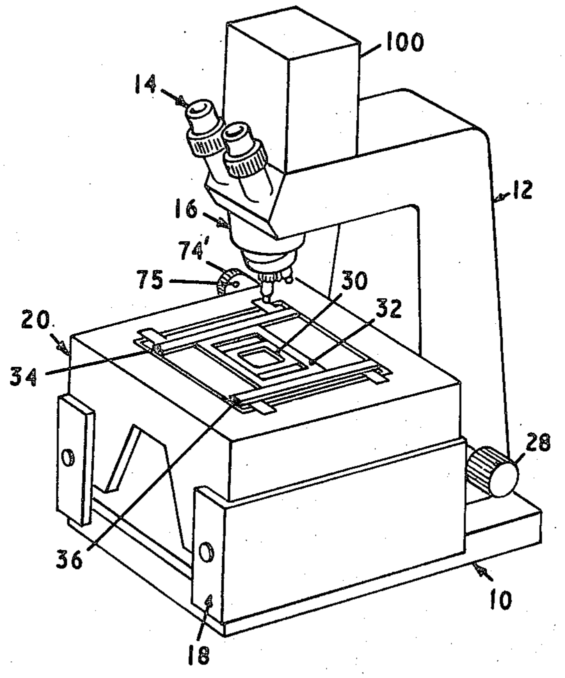

The stepping of the stage components 30 and 32 is synchronized with the frame scanning of the camera 100 by deriving the stepping signals for the motors 30′ and 32′ from signals derived from a master control circuit 164. Signals indicative of the line and frame scanning frequencies of the television camera 100 are provided on lines 166 and 168 and the control circuit 164 provides a read signal at junction 170 during each frame scan. The read signal is a series of electrical pulses which define a so-called blank frame or mask within the scanned area of the camera. Circuit 164 may for example comprise a so-called mask generator of the type described and illustrated in U.S. Pat. No. 3,551,052. The read signals are gated by gate 172 and appear at junction 174 as analyse signals. The gate 172 does not alter the form of the read signals but merely inhibits them during certain frame scans as will hereinafter be described. The analyse signals are applied to a control circuit 176 which derives a single pulse at the end of the sequence of pulses forming each analyse signal. This single pulse is applied to the control circuit 178 which serves to provide the electrical pulses to stage stepping motors 30′ and 32′ respectively. Control circuit 178 additionally de-codes the pulses supplied to it so as to provide the appropriate signals to motors 30′ and 32′ so as to effect a desired form of raster type movement of the specimen relative to the optical axis of the microscope. Typically the raster is that of a television scanning type raster and involves a flyback period at the end of each complete traverse in the X direction.

Control circuit 178 is programmable to adjust motors 30′ and 32′ to locate the specimen into the starting point of the raster termed the origin by means of a control circuit 180 controlled by an initiate signal. The initiate signal for control circuit 180 may for example be controlled by a push button mounted conveniently on the front of the apparatus.

The signals from control circuit 176 are counted by a counter 182 having an adjustable capacity. Although not shown, a control may be provided on the front of the apparatus for adjusting the capacity of the counter which is conveniently of the so-called overflow type and produces an output signal on line 184 when the appropriate number of pulses have been counted.

The counter output signal is applied to a further control circuit 186 which generates a signal EON indicating the end of $n$ step pulses. A signal is also provided from control circuit 186 which is applied via OR gate 188 to the reset input of counter 182 to reset the counter to zero.

In order to reset the counter at the beginning of an analysis sequence another input of the OR gate is supplied with the initiate signal.

A second counter 190 is set to count the number of step pulses supplied to motor 30′ which drives carriage 30 in the X direction. Counter 190 is similar in form to 182 and is therefore of the so-called overflow type. Its counting capacity is adjustable and as shown in the embodiment is denoted by N. The value of N is equal to the number of steps made by the carriage 30 traversing completely from one side of the carriage mounting 32 to the other. Where additional provision is made for varying the step size of the incremental movement of the stage, the overflow capacity value N is made dependent on the particular step size chosen at any time.

The overflow signal from counter 190 is supplied to a second control circuit 192 which provides a signal EOL to indicate the end of each line of incremental steps of carriage 30 and a reset signal via OR gate 194 to the reset input of counter 190. The reset signal resets counter 190 to zero.

As with counter 182, OR gate 194 has a further input to which the initiate signal is supplied.

Since the end of line signal EOL is required to restart the focussing sequence, (since the presence of the EOL signal indicates the flyback condition of carriage 30) OR gate 188 has an additional input to which the EOL signal is supplied. Counter 182 is thus reset to zero either at the end of N step pulses from control circuit 176, or from an initiate pulse indicating that an analysis is to be started or restarted from the origin or by an end of line signal EOL from control circuit 192.

Turning now to the remainder of the system, the video signal from T.V. camera 100 is normally inhibited from passing to comparator 158 by gate 154 which is closed by a signal from control circuit 196 via OR gate 198. The control circuit 196 provides the closing signal in the event of either an initiate signal having been given or an EON or EOL signal having appeared. The signal is only terminated when an in focus signal is obtained from the automatic focussing system to be described later.

However video signal from camera 100 is supplied via gate 152 to the focus signal deriving network 132 when gate 152 is opened. The open signal for this gate is derived from further control circuit 200 to which the initiate EON and EOL signals are supplied as priming signals. The appearance of any one of these signals renders the control circuit into a primed condition so that the appearance of the next sequence of read pulses also supplied to the control circuit 200 from junction 170 can pass to open gate 152. The latter is therefore opened at the appropriate intervals during each line scan of the first complete frame scan after an initiate, EON or EOL signal. The output signal from control circuit 200 which appears at junction 202 is described as a "focus-read" signal since it indicates when the system 132 is receptive of signals from which a focus signal can be derived. The signals at junction 202 are required for activating further control circuit means to be described later.

At the end of the first complete frame scan a focus indicating signal FF1 will be available at junction 204.

Figure 3:
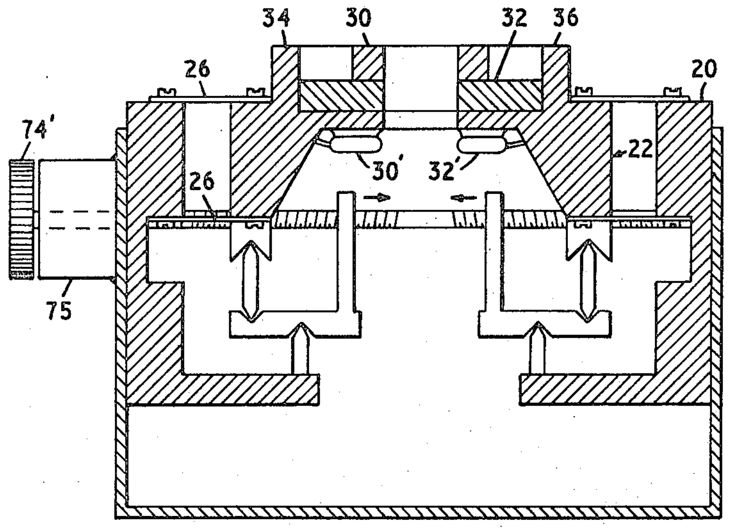
Figure 2:
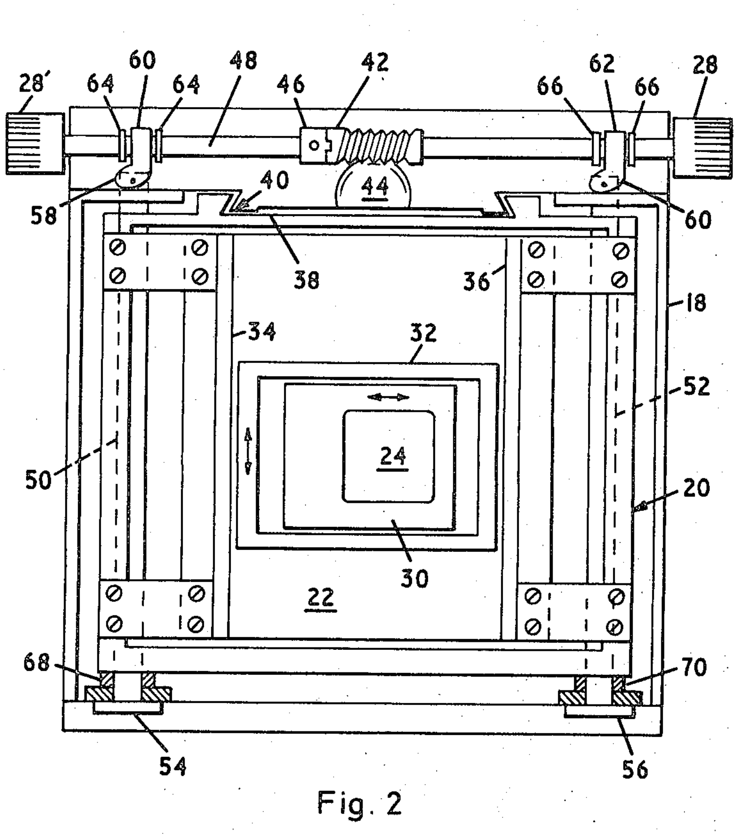

Store 138 is provided to hold this signal so that it can be compared with the corresponding focus indicating signal from the next frame scan after adjustment of the focus control by motor 75 (see FIGS. 1 to 3). To this end, store 138 is cleared by an initiate signal via OR gate 206 so as to be ready to receive FF1.

Signal FF1 at junction 204 also appears at input I of comparator 140 via line 208 and a control circuit 210 supplied with the focus-read signal from junction 202 as one of its inputs, provides an appropriate opening signal for gates 211, 211′ in the output of comparator 140. Output signals are thus available from comparator 140 at the end of the first frame scan. Because there is no signal from store 138 an unbalance is guaranteed so that output signals will be available as an input to control circuit 142. One of the output signals indicates the magnitude and the other the "sign" i.e. direction of the unbalance.

Because of the unbalance this circuit will produce an out of focus signal OOF and will also provide a signal to perturbation direction selector 144 controlling the generation and sign i.e. direction of a perturbation signal by generator 136 which in turn provides a forward or reverse pulse to stepping motor 75 to adjust the fine focus control and alter the focus of the image.

Focus read signals from junction 202 are supplied to control circuit 142 as a reset signal to remove the INF output signal and restore the OOF signal, pending a new focussing sequence.

As shown, a step size selector 212 is also provided which is adjustable to vary the actual size of the perturbation signal supplied to this stepping motor 75. In this way the actual arcuate travel of the fine focus adjusting shaft 76 (see FIG. 3) is controllable.

The movement of the stepping motor 75 and adjustment of the focus is assumed to take very little time and for simplicity to be achieved within the fly-back period between frame scans so that the next set of read signals applied to control circuit 200 to open gate 152 produce at junction 204 a focus indicating signal indicative of the newly focussed condition of the image as a result of the step of the focus control motor 75. This signal FF2 is applied via line 208 to input I of comparator 140 and simultaneously signal FF1 in store 138 appears at input II of comparator 140. The output signals are transferred via gates 211, 211' to control circuit 142 once again.

The latter has applied to it a limit signal with which the difference signal (FF2, FF1) from comparator 140 is compared. If the difference signal lies outside the limit, the out of focus signal is generated and a further perturbation in the appropriate direction is generated and the stepping motor 75 is controlled appropriately. The process is repeated until such time as the difference signal from comparator 140 falls within the limit imposed on control circuit 142. At this time the out of focus signal 00F disappears and an in focus signal INF appears.

This latter signal is applied to various of the control circuits already mentioned to act as follows:

It is applied to a monostaple multi-vibrator 214 the output pulse from which serves as a trigger pulse for control circuit 196 which thereafter cancels the "close" signal applied via gate 198 to close gate 154, thereby opening the latter. The close signal for gate 154 is generated once again by the appearance of a step stage pulse at junction 216 from control circuit 176. To this end the step stage pulses are applied as a further input to control circuit 196. In this way gate 154 is opened for the duration of the first complete frame scan after an INF signal has been generated from control circuit 142 but is closed again immediately thereafter and remains closed until a new INF signal is generated.

The INF signal is also applied to one input of a further control circuit 218 which provides an output signal to open gate 172. Control circuit 218 has two further inputs to which are supplied the EON and the EOL signals respectively from circuits 186 and 192. The appearance of either an EON or an EOL signal removes the open signal from gate 172. The latter is therefore opened as soon as an INF signal has been generated and remains open until an EOL or an EOL signal is generated. The opening of gate 172 released the next set of read pulses from control circuit 164 as analyse signal pulses which appear at junction 174 and provide the open signal pulses for gate 156 also in the signal path from junction 150 to comparator 158. Since gate 154 is also opened for the first frame scan after an INF pulse, the video signal pulses from junction 150 during the first complete frame scan after an INF pulses have been generated appear at comparator 158 and are compared with reference 160 to provide detected video signal pulses at junction 162 as heretofore described.

The INF signal is also applied as a cancel signal to control circuit 200. The cancel signal terminates the focus-read signal at junction 202 and also removes the open signal for gate 152 thereby preventing the further transfer of video signal to system 132.

The INF signal is also applied to a monostable multivibrator 220 the output pulse of which serves as a clearing signal via OR gate 206 for store 138. The latter is therefore cleared as soon as an in focus condition is detected so as to be ready to receive the next series of focus indicating signals from system 132 during the next automatic focussing operation.

Lastly the INF signal is applied to control circuit 210 to terminate the open signal for gate 211. In this way the control circuit 142 is not presented with any further different signals. The INF signal is continuously generated by circuit 142 until the beginning of the next automatic focussing sequence.

DETAILED DESCRIPTION OF OPERATION

Assuming that the sequence of events is started by an initiate signal, it will be seen that this resets the position of the specimen mounted on carriage 30 to the origin of the pattern of movement of the carriage and carriage mount mechanism. The initiate signal also clears store 138 and counters 182 and 190 and primes control circuit 200 so that the following read signals from junction 170 open gate 152 and allow the automatic focussing system formed by blocks 132 through to 75 to function during the frame scans until such time as an in focus condition is detected and an INF signal is generated by control circuit 142.

As described above the INF signal stops the automatic focussing sequence, renders the input circuits to the detector 158 in a receptive condition to receive the next frame scan of video signal from camera 100 and also produces the necessary signals for opening the gates in the input circuit detector 158. The same signals are utilised to derive the stepping signal for stepping the specimen and the step stage pulses are applied to control 178 which decodes them where necessary to provide the appropriate stepping movements of the carriage 30 and carriage mounting 32 in the X and Y directions respectively.

In accordance with the invention after *n* stepping movements of the stage in the X direction, counter 182 overflows and an EON signal is generated from control circuit 186 which terminates the open signal for gate 172 and thereby prevents the further stepping of the stage components until the end of a complete automatic focussing sequence. The EON signal also serves to open gate 152 to render the automatic focusing system receptive to video signal from camera 100 and the automatic focussing sequence is repeated until an INF signal is obtained from control circuit 142 indicating that the analysis can proceed.

In the same way, when the counter 190 overflows indicating that a complete X traverse has occurred, the EOL signal is generated which operates in an identical manner to the EON signal and initiates a complete automatic focussing sequence. It will be seen that by virtue of the timing of the various pulses the automatic focussing sequence will in fact be carried out on the next field of view to be presented to the microscope and camera and therefore will in fact correspond to the first field of view on the next line of scan of movement of the stage components 30, 32.

STORAGE OF FOCUS INFORMATION

The position of the stepping motor 75 can be described electrically by means of at least two signals and a refinement of the invention involves a store 222 and control circuit 224 therefor. The store is cleared by an initiate signal and in turn the control circuit 224 is primed by an initiate signal. The second input of control circuit 224 is supplied with the INF signal from control circuit 142 and the first INF signal after an initiate signal has been received by control circuit 224 serves as a read instruction for store 222 to read and store the position of the stepping motor 75 and in consequence the position of the fine focus adjustment. The position co-ordinate signals are stored in 222.

The EOL signal from control circuit 192 is also supplied as an input signal to control circuit 224 the receipt of which produces an address and read-out command signal for store 222 along a second output line to transfer the information in the store to a motor control circuit 226 which in turn provides appropriate signals to the stepping motor 75 to alter the position of the motor (if necessary) so that the motor adopts the same position (and therefore the same position of the fine focus mechanism is achieved) as obtained when the INF signal for the first field of view of that line was in focus. Simultaneously of course the stepping motors 30' and 32' will have moved the stage components 30 and 32 so that the new field of view presented to the microscope is the first field of view on the next line and since it is assumed that the focus will only vary very slightly between adjoining fields, the tendency for focus drift to occur due to tilt of the specimen in the X direction and resulting long time delay required at the beginning of each line before focussing is achieved, will be eliminated.

The appearance of an EOL signal at control circuit 224 also primes the control circuit 224 in the same way as an initiate signal does so that the next INF signal received by the control circuit 224 produces the read and store command signal for store 222 to store the next in focus condition position of the motor 75 i.e. that corresponding to the first field of view on the new line.

The process is of course repeated at the end of the line and thereafter until the end of the raster of lines making up the X and Y stage movement.

POINTS OF MODIFICATION

Previously it has been described that the read pulses at junction 170 are derived from each frame scan of the T.V. camera 100 so that a read signal will appear during each frame scan. In practice this means that the settlement time for the stage components 30, 32 following a stepping command from control 178 and also the settlement time required following a perturbation applied to motor 75 must be a small fraction of the frame flyback time period which itself will be very small.

In practice this is virtually impossible to achieve and one or two frame scan periods are required to ensure that all movement has ceased and settlement has occured. Consequently the read pulses obtained from control circuit 164 are not supplied every frame scan but the latter divides down the frame frequency and provides read pulses for example during alternate frame scans or even more infrequently. Thus where a large step size is employed for motors 30' to 32' and/or focus control motor 75, three or four frame scan periods of camera 100 may be required before true settlement has occurred. In this event control circuit 164 is arranged to provide read signals from only every fourth frame scan of the camera, for example.

MODIFICATION TO REDUCE BACKLASH ERROR

It has been found that the following modification reduces the error introduced due to backlash in the gearing of the stepping motor reduction drive and in the inevitable backlash between drive members forming the focus adjusting mechanism.

Figure 4:
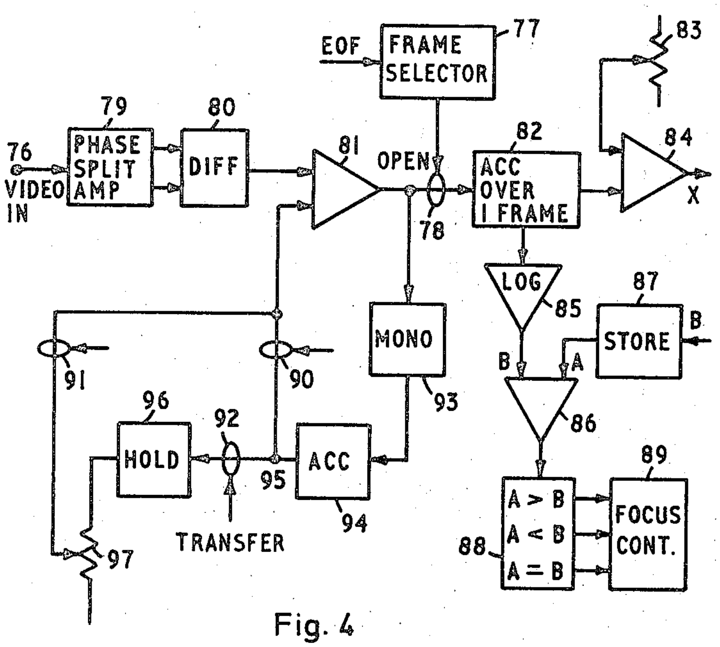

The refinement comprises the addition of a further control circuit (not shown) which modifies the control pulses supplied to the stepping motor 75 in the following manner. One direction of rotation of the focus adjusting mechanism is selected as a preferred direction of rotation and the other is referred to as the reverse direction. It does not matter which direction of rotation is selected as the preferred direction but for the purpose of description with relation to FIG. 4 of the drawings, the forward direction of motor 75 will be selected as the preferred direction.

The additional control circuit arranges that the motor will always approach its position of rest from the same direction irrespective of the net change in arcuate position of the motor as a result of the step signal supplied thereto. To this end, the additional control circuit transmits forward step pulses to motor 75 in an unmodified condition but modifies the step pulses which will result in the motor reversing direction in the following manner. Instead of transmitting the reverse direction step pulse, the latter is converted into a step pulse the magnitude of which will produce a reverse direction motion of the stepping motor four times that of the original step pulse. i.e. if the original reverse step pulse would ideally have produced a reverse arcuate movement of $x°$ the enlarged step pulse produces a reverse direction arcuate movement of $4x°$.

Immediately thereafter the additional control circuit is arranged to produce a forward direction step pulse of magnitude sufficient to produce a forward direction arcuate movement of the motor of $3x°$. At the end of this second enlarged step pulse, the net movement of the motor will be seen to have been $x°$ in the reverse direction.

The refinement allows all the backlash in the motor, gearing and focus adjusting drive mechanism to be taken up during the first part of each of the enlarged arcuate steps so that the net movement of the motor in response to a step signal pulse supplied thereto is the same irrespective of the direction of rotation.

Figure 5A:
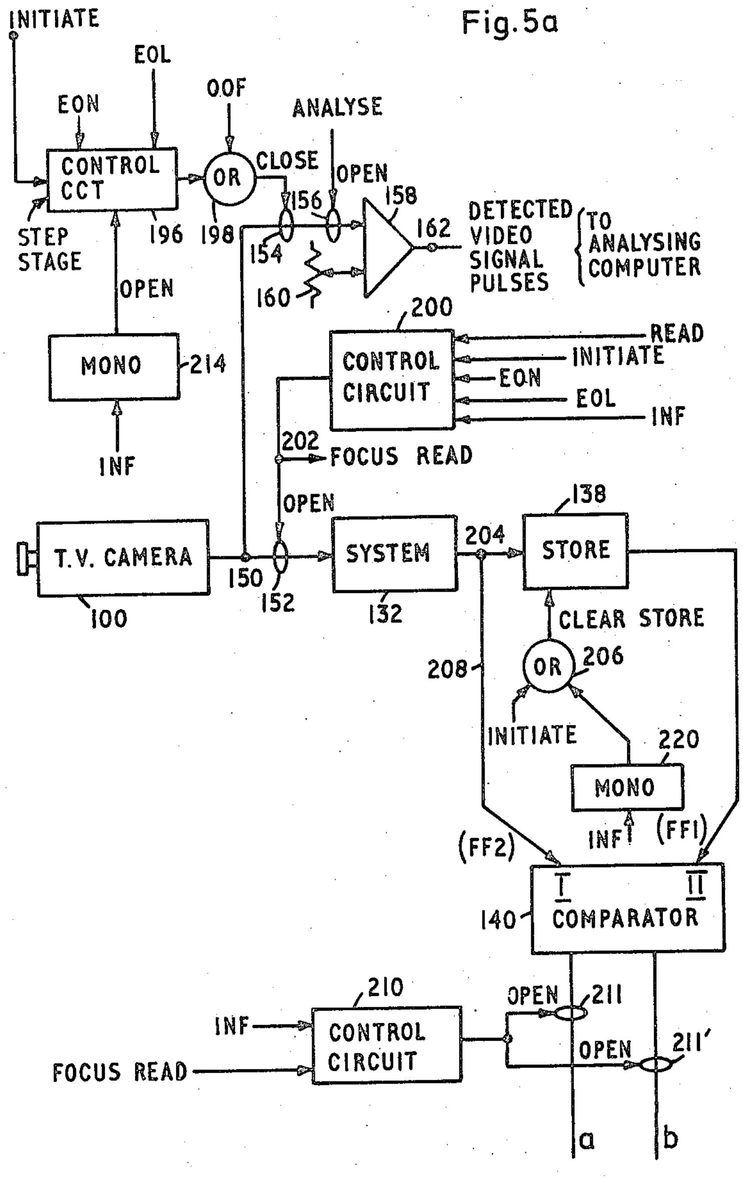
Figure 5B:
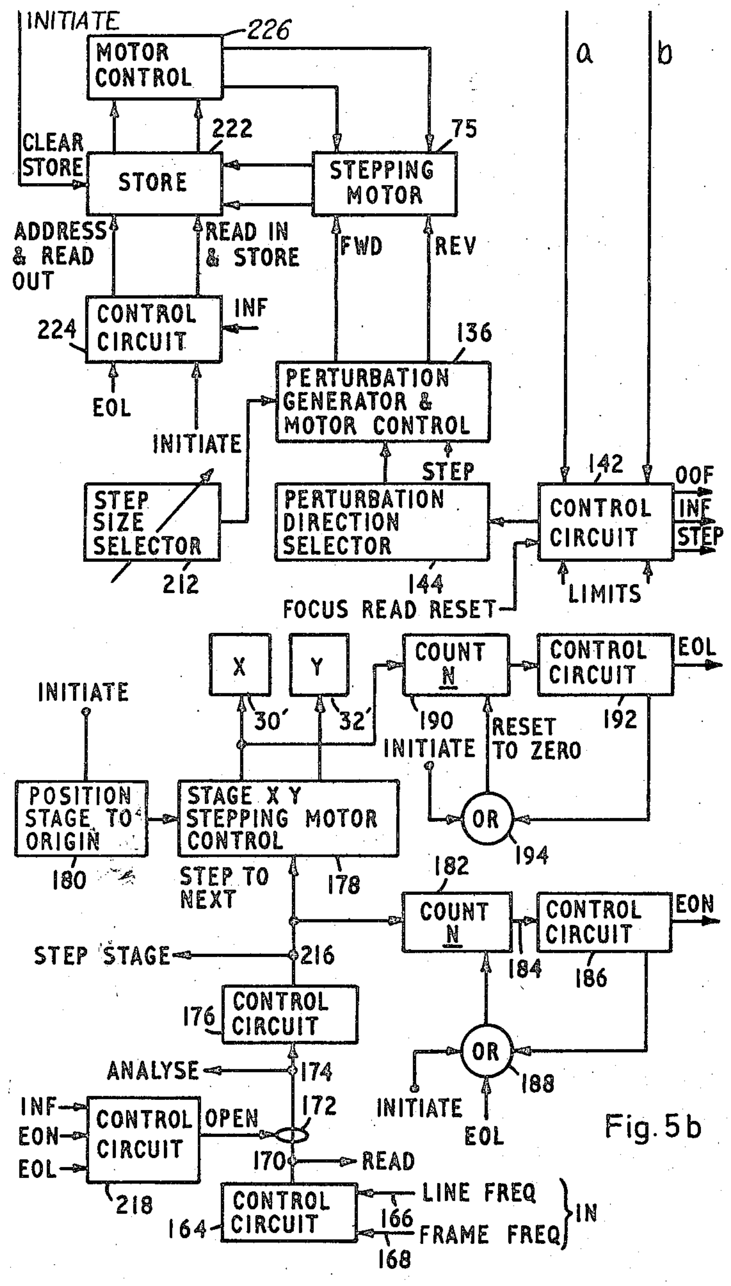
Figure 6:
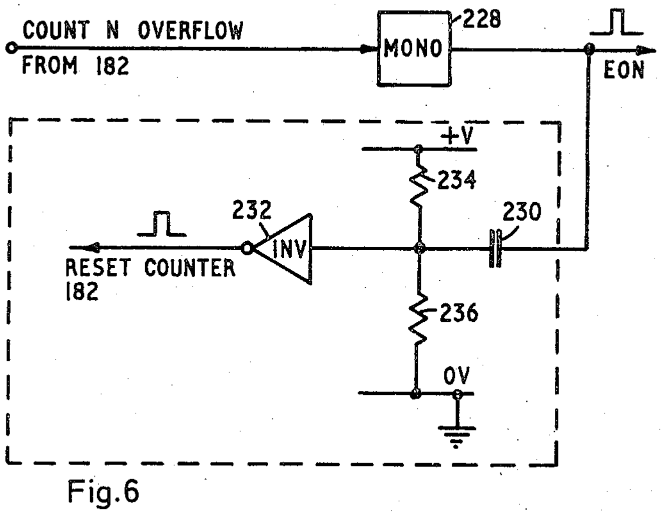

FIG. 6 illustrates a circuit for control circuit 186 of FIG. 5. The overflow signal from counter 182 triggers a monostable 228 to produce a pulse EON. The pulse is transferred via capacitor 230 to the input of an inverting amplifier 232, which is held at a given positive potential by resistors 234, 236. By suitable choice of potential a positive going reset pulse for counter 182 is obtained in the output of amplifier 232 at the trailing edge of a pulse from the monostable 228.

Figure 7:
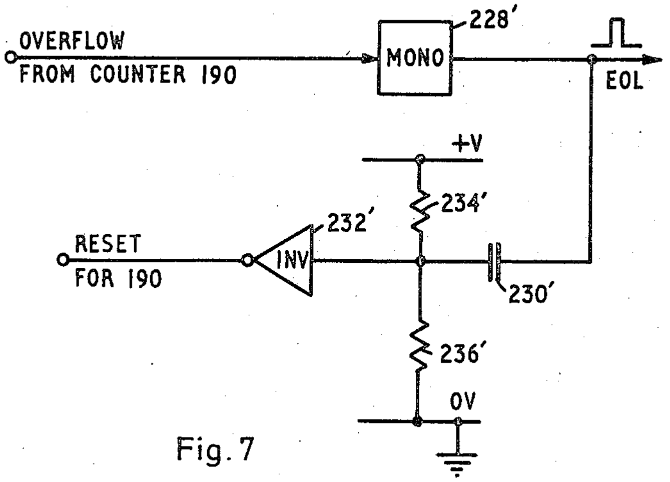

FIG. 7 illustrates a circuit for control circuit 192 of FIG. 5. Here the overflow signal from counter 190 triggers a monostable 228' to produce a pulse EOL. Since the circuit is similar to that of FIG. 6 the same reference numerals have been employed with the addition of a suffix. The pulse from amplifier 232' serves as a reset for counter 190.

Figure 8:
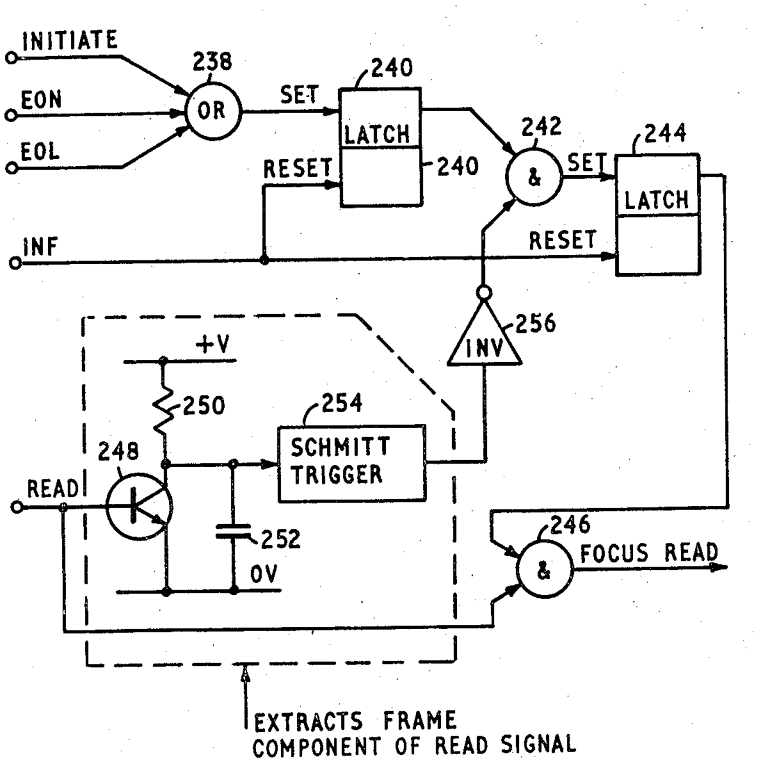

FIG. 8 illustrates a circuit for control circuit 200, which provides a "focus-read" signal when primed from an EON or EOL signal or an initiate signal, as previously described. To this end the EON, EOL and initiate lines provide three inputs for an OR gate 238 to supply a SET signal for a bistable latch 240. The SET output provides one input for an AND gate 242. The AND gate output provides a SET signal for a second bistable latch 244. A signal from control circuit 142 (to be described) — INF, provides the reset signal for the two latches.

The SET output signal of latch 244 comprises one input to an AND gate 246. The READ signal pulses from circuit 164 (previously described) comprises the second input and the output of 246 comprises the "focus-read" signal.

The second input for AND gate 242 is also derived from the READ signal pulses. To this end these are supplied as an input to a transistor amplifier 248, 250. A capacitor 252 prevents the output voltage across load resistor 250 from altering sufficiently to trigger Schmitt-trigger 254 except at the end of a frame scan, during the frame flyback interval.

When triggered, 254 output voltage produces via an inverting amplifier 256 an output pulse which combines with a SET output signal from 240 to satisfy both inputs of AND gate 242, thereby setting latch 244 as previously described.

Figure 9:
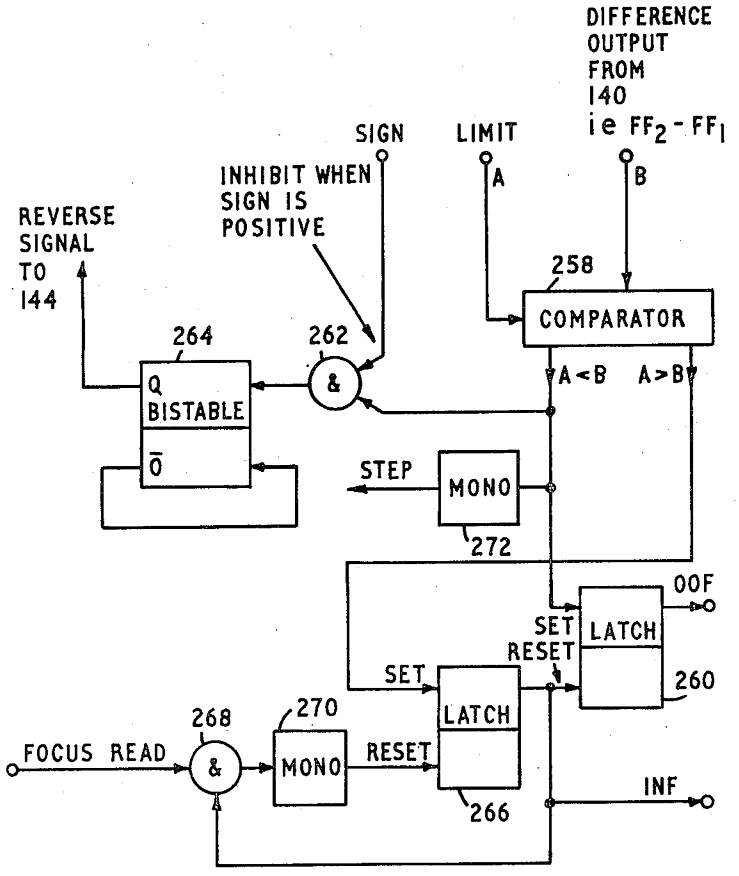

FIG. 9 illustrates a circuit for control circuit 142 which generates the command signals for perturbation direction selector 144 and the 00F and INF signals, during and after a focussing sequence. To this end the difference output signal (FF2–FF1) (=B) from comparator 140 is compared in a comparator 258 with a limit signal (=*A*). The *A*>*B* comparator output serves as a SET signal for a bistable latch 260 whose SET output signal comprises the 00F signal. The same comparator output signal serves as one input to an AND gate 262 the other input of which is supplied with the "sign" output from comparator 140. The gate is such that it is inhibited all the time the sign signal signal is positive. An output from gate 262 sets a bistable 264 whose Q output signal comprises a "reverse direction" signal to selector 144. To this end the Q output of the bistable 264 is connected to its other input.

A reset signal for latch 260 is obtained from the SET output of a further latch 266. This latter is SET by the other output from comparator 258 (i.e. A>B). The SET condition of latch 266 therefore corresponds to the INF signal output. This must be terminated as soon as the next "focus-read" signal appears (provided the system is already in focus and INF is already in existence). This is achieved by applying the "focus-read" signal and the INF signal as two inputs to an AND gate 268 whose output triggers a monostable devicw 270. The monostable output pulse is applied to the reset input of latch 266.

A further monostable 272 is triggered by the A B comparator output sighal to provide STEP command pulses for perturbation generator 136 (see FIG. 5).

Figure 10:
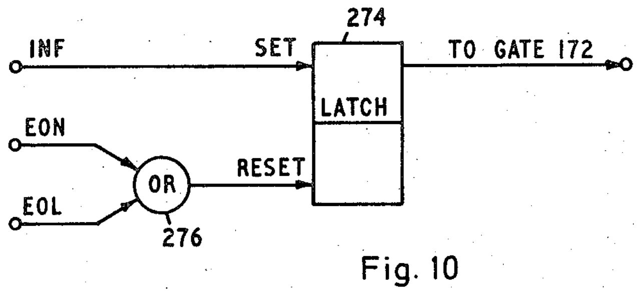

FIG. 10 illustrates a circuit suitable for control circuit 218. This comprises a bistable latch 274 having the INF signal supplied as a SET signal. The SET output signal of the latch comprises an OPEN signal for gate 172. EON and EOL signals are supplied via an OR gate 276 to the RESET input of the latch so that gate 172 is opened by INF but closed by either of EOL or EON.

Figure 11:
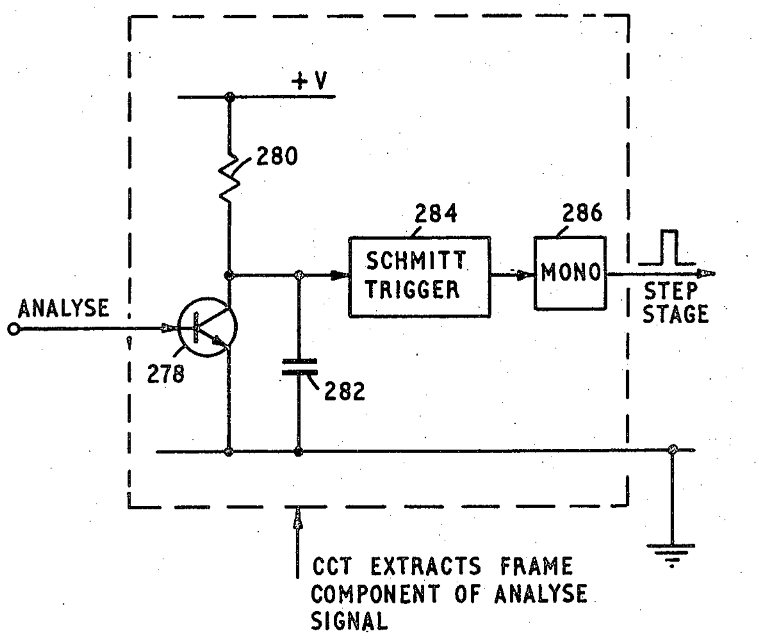

FIG. 11 illustrates a circuit suitable for control circuit 176. This circuit must generate a single step pulse at the end of each sequence of signal pulses forming the analyse signal from gate 172. To this end the analyse signal pulses are amplified by transistor amplifier 278 having a resistive load 280 and charging capacitor 282 whose joint time constant is similar to that of the time constant of the RC circuit 250, 252 of FIG. 8. In this way Schmitt trigger 284 is only triggered at the end of a sequence of analyse pulses and monostable circuit 286 generates the required step pulse from the triggered condition of 284.

Figure 12:
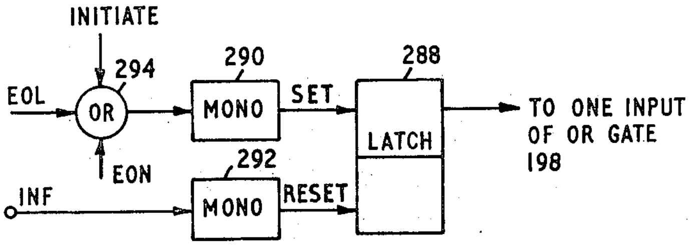

FIG. 12 illustrates a circuit suitable for control circuit 196 which generates one of the input signals for OR gate 198 (see FIG. 5). The circuit comprises a bistable latch 288 which is SET by pulses from a monostable 290 and RESET by pulses from a monostable 292. The SET output signals from the latch comprise the input signals to the OR gate 198. Monostable 290 is triggered by any of the signals "initiate", EOL or EON, which are therefore supplied thereto via OR gate 294. The second monostable 292 is triggered by the appearance of each INF signal.

Figure 13:
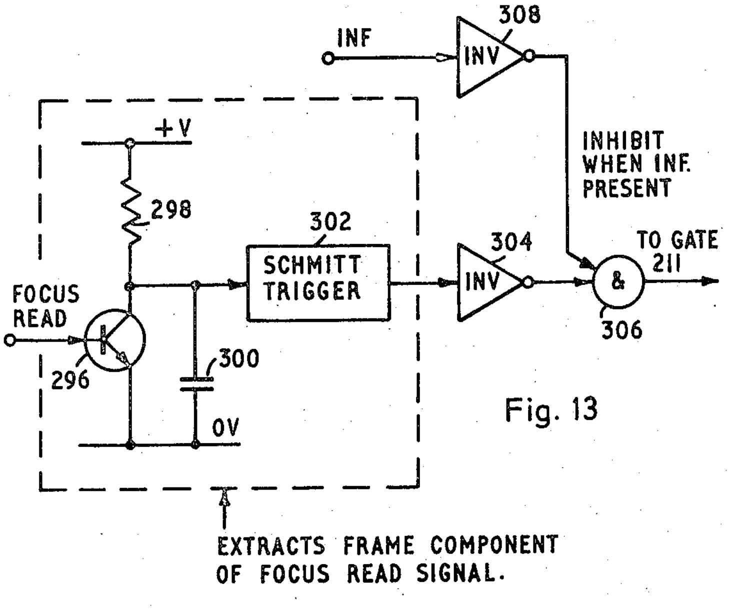

FIG. 13 illustrates a circuit suitable for control circuit 210. This provides a control signal to gate 211 (FIG. 5) to allow signal from comparator 140 to pass to control circuit 142 (previously described) via gate 211 except when INF is present. To this end the Focus Read signal pulses from control circuit 200 (see FIG. 8) are amplified by transistor amplifier 296 having resistive load 298 and charging capacitor 300 whose joint time constant is similar to that of 250, 252 of FIG. 8 so that Schmitt trigger circuit 302 is only triggered by the voltage across 300 at the end of a Focus Read signal sequence of pulses. The trigger output is inverted by inverting amplifier 304 or provide one input to AND-gate 306. The other is obtained from a second inverting amplifier 308 to which the INF signal is supplied as input signal. The output of AND gate 306 comprises the required control pulses for gate 211.

Figure 14:
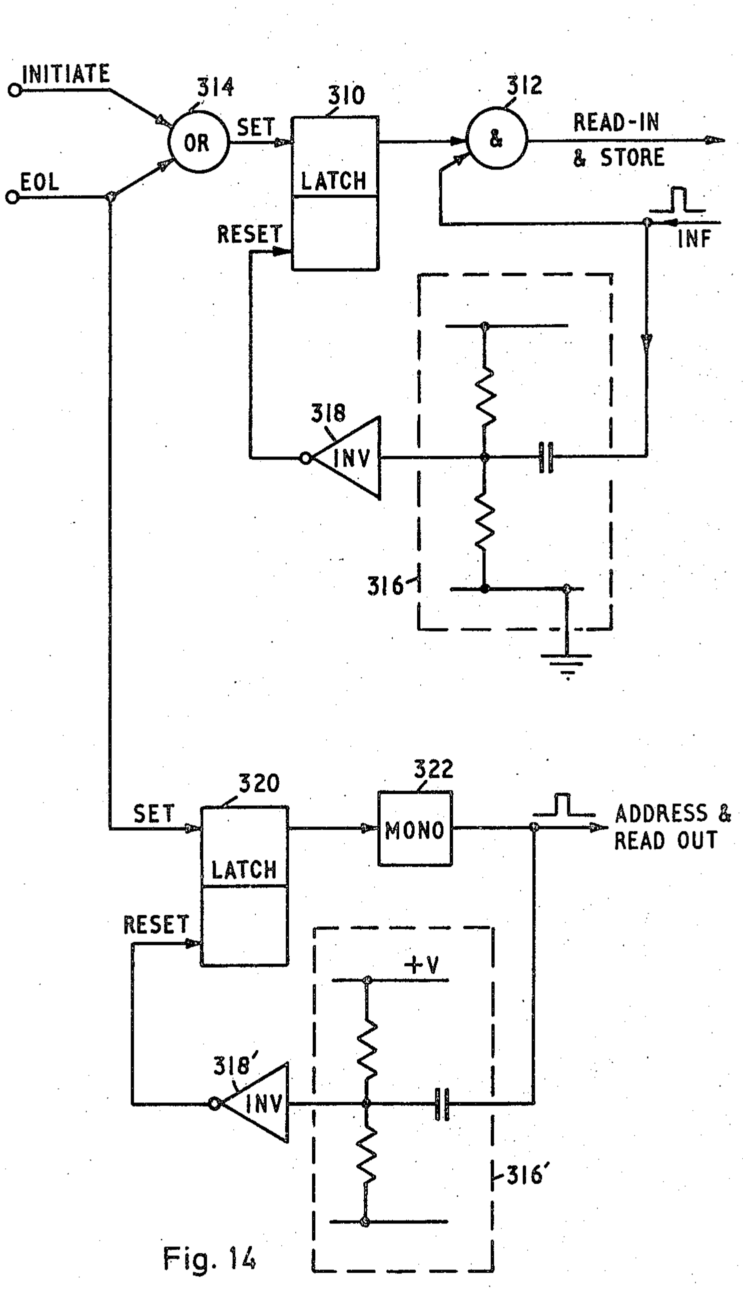

Lastly FIG. 14 illustrates a circuit suitable for use as control circuit 224. The first output signal (Read-in and Store) is obtained by combining the INF signal with the SET output of a bistable latch 310 by means of an AND gate 312. The latch is SET by either of the INITIATE or EOL signals via OR gate 314 and is RESET at the end of an INF signal by RC network 316 and inverting amplifier 318 to which the INF signal is supplied.

It will be seen that the action of the OR gate 314 is to cause the AND gate 312 to be "primed" by either an INITIATE or EOL signal, so that the next INF signal produces the READ-in and Store signal in its output.

The EOL signals are also supplied an SET signals to a second latch 320, the SET output signal from which constitutes a trigger signal for a monostable circuit 322. The monostable output pulses constitute the Adress & Read-Out signals for store 222 (see FIG. 5). Using a circuit 316' and inverting amplifier 318' similar to the circuit 316 and amplifier 318 previously described, a RESET signal is obtained for latch 320 from the trailing edge of each monostable output pulse.

In certain of FIGS. 6 – 14 reference has been made to a so-called bistable latch. Such a device is the RS latch type SN 74279 as produced by Texas Instruments Inc. In general, where the RESET output of such a device is not shown connected to a part of the circuit, it is to be connected to ground i.e. zero volts.

It is to be understood that the invention is not limited to each or any of the embodiments illustrated in the drawings which are by way of example only, many variations being possible as will be obvious to those skilled in the art and the scope of the invention is to be construed only with reference to the following claims.

I claim:

1. In a method of analysing a specimen which involves the steps of forming an image of each of a plurality of small areas of the specimen, scanning each of a succession of images to produce a video signal the amplitude excursions of which are analysed to perform said analysis and deriving an electrical signal indicating the focus of the image for controlling the operation of an automatic focussing system for focussing the image, the improvement comprising:

enabling the automatic focussing system only prior to the analysis of the first small area and each *n*th small area thereafter (n being greater than one), maintaining the focus settings achieved for said first small area and for each *n*th small area while the intervening small areas are analysed, and;

selecting the desired value of *n*.

2. The method as set forth in claim 1 further comprising the step of moving the specimen relative to the optical system forming the image in a series of steps along parallel lines to obtain the said succession of small areas.

3. The method as set forth in claim 2 further comprising the step of enabling the automatic focussing system prior to the analysis of the first small area at the beginning of each new line so that an automatic focussing step is performed at the beginning of each new line.

4. The method as set forth in claim 3 further comprising the additional steps of storing information relating to the focus setting for the first small area of each of line for the duration of the line and returning the focussing system to this setting before the automatic focussing system is enabled at the beginning of the next line.

5. The method as set forth in claim 1 further comprising the steps of generating an electrical pulse each time a small area is analysed, counting successive electrical pusles by means of a pulse counter having a capacity of *n*, and generating an electrical command signal to stop the further analysis of small areas and initiate an automatic focussing step when the counter overflows.

6. The method as set forth in claim 5 further comprising the step of adjusting the capacity of the pulse counter to vary the value of *n*.

7. The method as set forth in claim 1 further comprising the step of generating a frame blanking signal for releasing the video signal only during every *n*th frame scan of an image of a small area, to allow settlement of the specimen to occur before measurement is made on the video signal.

8. The method as set forth in claim 1 further comprising the step of generating a rotation producing electric current for an electric motor drive in response to an adverse focus indicating signal, movement of the drive producing movement of the specimen in a direction to improve the focus of the image of the area thereof which is being scanned to produce the said video signal.

9. The method as set forth in claim 8 wherein the net movement of the motor from a rotation producing current pulse is always $k°$ from its last position either in one direction or the other, depending on the polarity of the pulse.

10. The method as set forth in claim 9 further comprising the step of selecting one direction of rotation of the motor as the preferred direction of rotation and selecting the corresponding current pulse polarity as the preferred polarity, modifying each pulse of opposite polarity so as to produce a motor movement of $(p \times k)°$ (where $p>1$) and generating immediately after the modified pulse a correction pulse of preferred polarity and magnitude (or duration) to produce a preferred rotation of $((p-1) \times k)°$.

11. Apparatus whereby a specimen can be analysed for optical characteristics comprising, means for mounting and illuminating a specimen, optical focussing means for producing an image of an area of the specimen on a photosensitive surface, means for moving the specimen in a series of steps to present a succession of different areas thereof to the optical focussing means, means for scanning the photosensitive surface to generate a video signal of each imaged area, means responsive to the video signal for making measurements thereon to perform said analysis, circuit means also responsive to the video signal to derive from the amplitude excursions thereof an electrical signal indicative of the focus of the image and automatic focussing means responsive to a focus indicating signal for adjusting the optical focussing means to alter the focus of the image, further comprising circuit means for deriving the focus indicating signal from the video signal, a gate for inhibiting the passage of video signal to the circuit means, a first control circuit for generating a signal for opening the gate, a second control circuit for generating a signal (INF) for indicating when the image is correctly focussed which signal serves to terminate an opening signal from the first control circuit, a counter for counting the number of consecutive areas of the specimen which are analysed after an (INF) signal is generated, the counter being of the type which produces an overflow signal when *n* steps have been counted and a third control circuit responsive to an overflow signal to generate a further signal to cancel the last generated (INF) signal and initiate a new focussing sequence of the automatic focussing means.

12. Apparatus as set forth in claim 11 further comprising means for adjusting the count capacity of *n* of the counter.

13. Apparatus as set forth in claim 11 further comprising a second counter for counting the number of successive steps of specimen movement in one direction, the second counter being of the type which produces an overflow signal when the number of steps counted (m) is equal to the number of steps in the said one direction which are made before flyback of the specimen occurs in the opposite direction, a fourth control circuit responsive to an overflow signal from the second counter for generating an (EOL) signal indicating the end of a line of analysed areas and therefore the specimen flyback condition, said first control circuit also being responsive to an (EOL) signal to also terminate the open signal for the said gate and to initiate a further automatic focussing sequence.

* * * * *